United States Patent Office 3,541,007
Patented Nov. 17, 1970

3,541,007
USE OF RETICULATED FOAMS FOR PURIFICA-
TION AND SEPARATION OPERATIONS
John J. van Venrooy, Wyncroft, Media, Pa., assignor to
Sun Oil Company, Philadelphia, Pa., a corporation of
New Jersey
No Drawing. Filed June 18, 1969, Ser. No. 834,516
Int. Cl. B01d 15/08
U.S. Cl. 210—31                                    4 Claims

ABSTRACT OF THE DISCLOSURE

A method of adsorption chromatography wherein the packing material used in the process is an open celled high molecular weight foam polymeric material, such as reticulated polyurethane foam. The separation is based on the ability of the packing material to selectively absorb more-polar compounds from less-polar compounds.

---

The present invention relates to liquid separation and analysis and more particularly to chromatographic columns for making such analysis. More particularly, the invention relates to adsorption chromatography and the packing material of the chromatographic column.

Adsorption chromatography is an analytical technique that has found use in the determination of trace components, preparation of pure materials and the monitoring of process streams to name a few applications. A sample of material to be analyzed is passed in a liquid solvent carrier through a column which is usually packed with a particular material which is selected to obtain a desired separation. In effect the constituents of the sample are removed from the solvent and retained in the packing. The liquid solvent can also act as an eluting liquid and remove particular constituents in a particular order from the packing material, or a second liquid acting as a displacement medium can be added for such purpose. As the constituents are eluted or displaced from the packing material and pass out of the column, they pass through a sensitive detector. Because of the nature of the chromatographic column, small samples of material for analysis are fed into the column. Where a continuing analysis is desired, for instance, in process control, a series of small samples are fed into the column at intervals sufficient to allow the previous samples to have been completely eluted.

An important technique in adsorption technology is the use of a solid stationary phase having adsorptive properties as the column packing wherein the mobile phase employed in the column is a solution. The important features of this technique are the adsorptive quality of the solid phase and the competition for the surfaces thereof between the solute molecules and the solvent. Heretofore, a large number of adsorbents have been employed as the solid phase including sucrose, talc, calcium carbonate, magnesia, silicic acid, alumina and charcoal. The overall effect of the solid adsorbents on the adsorption is a function of its chemical composition and its physical structure. The chemical properties of the adsorbent are utilized based on its attraction for specific molecules or ions, the polarity or non-polarity of the surface, and the regularity of chemically active surfaces. The effect of the physical structure on the adsorption properties is basically a function of surface area and active adsorption sites; i.e. within a crystal lattice the corners will be more active than the edges which in turn are more active than the surface faces.

Although most of the common adsorbent materials previously noted have been generally successful in chromatographic procedures, one problem which sometimes develops from their use is their inherent catalytic activity. This of course can have a very undesirable effect on the desired analysis. Examples of such difficulties are the aminolysis of amino acids by charcoal (catalyzed), the isomerization of olefins by alumina, and the polymerization of acetone by alumina. A further inherent problem in some commonly employed adsorbent materials is their selectivity for only certain compounds, thus creating applicability in only specific analytical situations rather than a broad base of applicability.

There are a number of differential methods of detection which are suitable for use in chromatography systems, for instance thermal conductivity, flame ionization, $\beta$-ray ionization, gas-density balance, infrared, mass spectrometry, radioactivity and electron capture. The detector will transmit a signal, usually by electrical impulse, to a recorder of the type that draws graphs or to a control device, for instance in process control, or to both.

It is an object of the present invention to provide an improved method of adsorption chromatography.

It is a further object of this invention to provide a column packing material for adsorption chromatography.

A still further object of this invention is to provide a packing material for adsorption chromatography having a wide range of application.

These and other objects of the invention will become more apparent as the invention is more fully disclosed.

In accordance with the objects of the invention, it has been discovered that adsorption chromatography can be carried out successfully when using an open-celled type foam as the solid phase adsorbent. The foams may be prepared in situ in the chromatography column, foamed and cut into pieces which fit into the column or foamed and ground to a particle size convenient for loading into the chromatographic column being prepared. The open-celled foam may be packed into the column under a compressive force in order to achieve maximum separation within the volume available and to minimize channeling. Too much compression should be avoided so as not to restrict the liquid flow rate through the column. This is of particular importance in large scale industrial chromatographic installations. The open-celled foams are preferably produced from high molecular weight polymers, i.e., molecular weight of 20,000 to 3,000,000. The term polymer is used to describe both homopolymers, graft polymers and copolymers. The use of such foams in gas chromatography has recently been described in U.S. Pat. No. 3,347,020 issued to the instant inventor and assignee herein. It should be noted that there has been no teaching in the prior art indicating that open-celled foams used in gas chromatography can likewise be used in adsorption chromatography.

Suitable open-celled foams which may be employed are epoxy resin, silicone resin, polyurethane resin, polystyrene resin, ureaformaldehyde resin, phenol-formaldehyde resin, styrene-butadiene copolymer, butadiene-styrene-acrylonitrile copolymer and the like. The foams employed may be rigid, semirigid or elastomeric. The open-celled foam materials may be used individually or in admixture together or with other chromatographic column packing materials.

The foamed plastics of the present invention should have as much open-celled structure as possible in order to provide large surface area and to allow the liquids to pass through easily. A foam that has a large percent of closed cells may be made operable for use according to the present invention by physical methods such as by grinding or crushing or chemical methods such as treatment with strong base so that the closed-celled structure is substantially destroyed.

The applicability of open-celled foams of this invention is predicated upon the ability of the open-celled plastic foams to selectively absorb more-polar compounds from less-polar compounds. Thus whenever a solution of compounds having different polarities is passed over the open-celled foamed material, the open-celled foamed material will selectively adsorb the more-polar compounds. With respect to a chromatographic process, it should be noted that in view of the above, the process is not limited to merely separating a polar solute from a non-polar solvent, but rather separating any number of liquid components wherein they are of different polarities. The affinity of the foam for the more-polar compounds is also important in displacing the adsorbed compounds for analysis, since the less-polar compounds adsorbed on the foam are more readily displaced, thus indicating the order of displacement. Displacement of the adsorbed compounds occurs when a compound more-polar than that already adsorbed is introduced into the chromatographic column. The instant invention is applicable to both organic and inorganic liquids.

The size of pores in the open-celled foam is not critical but should be in the range of from 0.05 to 20 mm. The open-celled foams may be produced by any of the methods known and described in the prior art such as those found on pages 36 to 205 of "Plastic Engineering Handbook," 3rd edition, Reinhold Publishing Corp., New York, 1960; U.S. Pat. Nos. 3,165,483 and 3,171,820. The open-celled structure of the instant invention is considerably more advantageous than the heretofore employed granular or particulate packing material due to the larger surface area of the open-celled material and thus the inherently more available active sites.

Although the foams may be produced in situ in the chromatographic column, it is preferred that the foam is produced externally in molds and subsequently cut or ground and placed in the column. This allows greater control over the uniformity of the foamed material. When foamed material is packed into the column, pressure may be applied to pack it uniformly in order to avoid channeling which reduces the efficiency of the column however too much pressure should be avoided in order to prevent flow restriction.

The foamed packing material of the present invention may be used in any conventional chromatography column in place of the prior art packing. The foamed packing material of the present invention will be particularly useful in large size commercial columns for producing high purity chemical materials. No critical limitation is to be placed on the operating temperature of the process except that it be such to maintain the mobile phase in the liquid state. Generally, temperatures in the range of about 20° to 30° are maintained, with ambient temperature being preferred.

The open-celled foamed materials of the present invention are inert at the temperatures at which the separations are conducted.

As a general mode of operation for the instant invention, a chromatography column is initially packed with an open-celled foam material. The mobile phase, i.e. a solution consisting of the materials to be analyzed as the solute and a solvent which is less-polar than the solute, is then introduced into the column. The solute will be adsorbed on the open-celled foam, and the solvent will pass through the column. Subsequently a displacement liquid, a developer, is introduced into the column to replace the adsorbed material which then passes out of the column. This effluent is monitored by a sample detector, such as infrared, as it exits from the column. The developer can merely be a compound more polar than all the materials adsorbed, or it can be a mixture such that it displaces the adsorbed compounds from the adsorbent in an orderly fashion. This latter method known as "displacement analysis" described in Technique of Organic Chemistry, Adsorption and Chromatography, Cassidy, vol. V, pp. 235–239, Interscience Publishers, Inc., N.Y., 1951.

The following examples are provided to illustrate the invention and not intended to limit its scope.

EXAMPLE 1

A glass chromatography column was packed with 21.7 g. of 80 pore per inch reticulated polyurethane foam prepared according to U.S. Pat. No. 3,171,820 issued to Robert A. Volz. The foam occuped a volume 1.0" diameter by 14" high.

The glass column was initially filled with 60 mls. of toluene; this being the volume of the column. Thereafter 300 ml. of a 1% by volume mixture of p-chlorophenol in toluene was introduced and started slowly through the column. This was followed by 250 ml. of pure toluene. The exit stream from the column was analyzed and after the passage of 550 mls. of solution through the column, no p-chlorophenol was observed exiting; thus indicating complete removal of p-chlorophenol from the toluene. The separation was carried out at ambient temperature, i.e. about 25° C. It should be noted that p-chlorophenol is more polar than toluene. The p-chlorophenol was then eluted from the foam packing by passing acetone through the column.

EXAMPLE II

Using the same apparatus and procedure of Example 1, a solution of p-chlorophenol in acetone, of approximately 0.33% by volume concentration, was allowed to pass through the glass column. Here, the p-chlorophenol was observed in the effluent from the column after only 100 ml. of liquid had exited, indicating that the acetone is sufficiently strongly adsorbed on the foam to prevent the adsorption of the p-chlorophenol.

EXAMPLE III

In another experiment a glass chromatography column was packed with 2.7 gms. of 92 pore per inch reticulated polyurethane foam. The foam packing occupied a volume 0.5" diameter by 12" high. The foam packing was pre-cut into cylindrical pieces 0.6" in diameter by 1" high and the cylinders compressed by a factor of two to insure a tight fit to prevent channeling. The glass column was initially filled with 45 ml. of pentane to saturate the packing. Using n-pentane as the solvent 116 ml. of solution containing 5% by volume of toluene, 5% by volume of n-amylbenzene, 5% by volume of 1,2,4-trichlorobenzene and 1% by volume of p-chlorophenol was started through the column. This was followed by 310 ml. of n-pentane. Upon analysis of the effluent stream after 75 ml. of liquid had exited it was observed by infrared analysis that both toluene and 1,2,4-trichlorobenzene were present along with a small amount of n-amylbenzene but no parachlorophenol. The n-pentane solvent was removed from the sample by evaporation before testing. After 126 ml. of liquid had exited from the column only 1,2,4-trichlorobenzene and toluene were present in the effluent, along with a small amount of n-amylbenzene. After 176 ml. of liquid had exited 1,2,4-trichlorobenzene, toluene and an increased amount of n-amylbenzene were present in the effluent but the p-chlorophenol was still retained on the column. After 226 ml. of liquid had exited from the column 1,2,4-trichlorobenzene and amylbenzene were present in the effluent but no toluene or p-chlorophenol. After 326 ml. of liquid had exited a trace amount of p-chlorophenol was present in the effluent but none of the other compounds. After 426 ml. of liquid had exited still only a small amount of p-chlorophenol was present in the effluent. Thereafter 50 ml. of acetone as a displacement agent was passed through the column with complete draining. This treatment effectively stripped the p-chlorophenol from the packing. The above example is indicative of the selective adsorption characteristics of these various compounds with respect to the foam packing and illustrates how mixtures of compounds may be separated.

I claim:

1. A method for separating p-chlorophenol from its solution in a solvent which comprises passing said solution at a temperature such as to maintain the solution in the liquid phase through a column packed with an open-celled foam of high molecular weight polyurethane.

2. A method according to claim 1 wherein said open-celled foamed material has a pore size in the range of from 0.05 to 20 millimeters.

3. A method according to claim 1 wherein said separation takes place at a temperature in the range of about 20° to 30° C.

4. A method according to claim 3 wherein said separation takes place at ambient temperature.

References Cited

UNITED STATES PATENTS

| | | | |
|---|---|---|---|
| 3,347,020 | 10/1967 | Van Venrooy | 55—386 X |
| 3,407,573 | 10/1968 | Crowley | 55—386 |

J. L. DeCESARE, Primary Examiner